US009336975B2

(12) United States Patent
Iizuka et al.

(10) Patent No.: US 9,336,975 B2
(45) Date of Patent: May 10, 2016

(54) POWER DISTRIBUTION APPARATUS SUPPLYING DIRECT-CURRENT POWER

(71) Applicant: FUJITSU COMPONENT LIMITED, Tokyo (JP)

(72) Inventors: Koji Iizuka, Tokyo (JP); Akio Nakamura, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 601 days.

(21) Appl. No.: 13/721,486

(22) Filed: Dec. 20, 2012

(65) Prior Publication Data

US 2013/0162053 A1 Jun. 27, 2013

(30) Foreign Application Priority Data

Dec. 27, 2011 (JP) ................................ 2011-285156

(51) Int. Cl.

| | |
|---|---|
| ***H01H 47/00*** | (2006.01) |
| ***H01H 9/44*** | (2006.01) |
| ***H01H 50/26*** | (2006.01) |
| ***H01R 13/66*** | (2006.01) |
| ***H02J 13/00*** | (2006.01) |
| *H01R 103/00* | (2006.01) |
| *H01R 13/703* | (2006.01) |
| *H01R 24/30* | (2011.01) |
| *H02J 1/00* | (2006.01) |

(52) U.S. Cl.

CPC ............... *H01H 47/00* (2013.01); *H01H 9/443* (2013.01); *H01H 50/26* (2013.01); *H01R 13/6683* (2013.01); *H02J 13/0003* (2013.01); *H01R 13/703* (2013.01); *H01R 24/30* (2013.01); *H01R 2103/00* (2013.01); *H02J 1/00* (2013.01); *Y02B 90/228* (2013.01); *Y04S 20/18* (2013.01); *Y10T 307/944* (2015.04)

(58) Field of Classification Search

CPC ... H01H 47/00; H01H 9/443; H01R 13/6683; H02J 1/00; H02J 47/00

USPC .......................................................... 307/116

See application file for complete search history.

(56) References Cited

U.S. PATENT DOCUMENTS

| | | | |
|---|---|---|---|
| 5,606,243 A * | 2/1997 | Sakai et al. | 320/134 |
| 6,476,728 B1 | 11/2002 | Sakakibara | |
| 7,021,950 B2 * | 4/2006 | Borrego Bel et al. | 439/181 |
| 2002/0157932 A1 * | 10/2002 | DeWitt et al. | 200/51.09 |
| 2009/0267714 A1 * | 10/2009 | Arioka et al. | 335/68 |
| 2010/0148983 A1 * | 6/2010 | Huxley | H01R 13/7038 340/815.4 |
| 2012/0239959 A1 | 9/2012 | Kiuchi et al. | |

FOREIGN PATENT DOCUMENTS

| | | |
|---|---|---|
| JP | H10-144409 | 5/1998 |
| JP | 2000-214186 | 8/2000 |

(Continued)

*Primary Examiner* — Scott Bauer

(74) *Attorney, Agent, or Firm* — Ipusa, PLLC

(57) ABSTRACT

A power distribution apparatus for supplying power from a direct-current power supply to a load via a first connector and a second connector includes a sensor unit configured to detect connected and disconnected states between the first connector and the second connector, a switch unit configured to make and break a connection between the first connector and the direct-current power supply, a receiver unit configured to receive a signal indicating whether to supply or cut off power to the load, and a control unit configured to control the switch unit to make or break the connection in response to the signal received by the receiver unit and the connected and disconnected states between the first connector and the second connector detected by the sensor unit.

5 Claims, 4 Drawing Sheets

(56) References Cited

FOREIGN PATENT DOCUMENTS

| | | |
|---|---|---|
| JP | 2001-267014 | 9/2001 |
| JP | 2006-014403 | 1/2006 |
| JP | 2010-086823 | 4/2010 |
| JP | 2010-213411 | 9/2010 |
| JP | 2011-120324 | 6/2011 |
| JP | 2011-146328 | 7/2011 |
| WO | 2010/038125 | 4/2010 |

* cited by examiner

POWER DISTRIBUTION APPARATUS SUPPLYING DIRECT-CURRENT POWER

BACKGROUND OF THE INVENTION

1. Field of the Invention

The disclosures herein relate to a power distribution apparatus for supplying electric power to a load.

2. Description of the Related Art

Various electrical equipments ranging from information technology equipment to household audio-visual equipment operate on a direct-current power supply. Since a commercial power supply is an alternate-current power supply, alternate-current to direct-current conversion is performed to supply electric power to such equipments, which results in conversion loss. Against this background, direct-current power feeding that supplies direct-current electric power to various electrical equipments has been attracting attention. Further, the control of on-and-off states of equipment through remote controlling has been expected to be put into practice for the purpose of energy conservation and efficient system utilization.

At the time of inserting a plug into or unplugging a plug from a socket for supplying power, the presence of zero-cross points at which an alternate-current voltage becomes zero voltage serves to suppress arc discharge. The absence of zero-cross points in direct-current power may readily cause generation of arc discharge, which may pose some danger.

In consideration of this, a power distribution apparatus may detect the connected and disconnected states of a plug to control power supply to a socket (see Japanese Patent Application Publication No. 2011-146328, for example).

When direct-current power supply to various equipments is to be remote-controlled, extra caution should be exercised to supply power to these equipments by reliably detecting the connected or disconnected state of plugs with respect to sockets. For example, remote control may be performed to supply power to a socket while a plug is not inserted. In such a case, inserting the plug into the socket after supplying power from a direct-current power supply to the socket may create arc discharge.

Accordingly, it may be desired to provide a power distribution apparatus that can reliably prevent generation of arc discharge while allowing the supply of direct current to equipment to be remote-controlled.

SUMMARY OF THE INVENTION

According to an embodiment, a power distribution apparatus for supplying power from a direct-current power supply to a load via a first connector and a second connector includes a sensor unit configured to detect connected and disconnected states between the first connector and the second connector, a switch unit configured to make and break a connection between the first connector and the direct-current power supply, a receiver unit configured to receive a signal indicating whether to supply or cut off power to the load, and a control unit configured to control the switch unit to make or break the connection in response to the signal received by the receiver unit and the connected and disconnected states between the first connector and the second connector detected by the sensor unit According to at least one embodiment, a power distribution apparatus is provided that can reliably prevent generation of arc discharge while allowing the supply of direct current to equipment to be remote-controlled.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

In the following, embodiments of the present invention will be described with reference to the accompanying drawings.

In the following, embodiments will be described by referring to the accompanying drawings. In these drawings, the same elements are referred to by the same references, and a description thereof may be omitted.

<Configuration of Power Distribution Apparatus>

Figure 1:
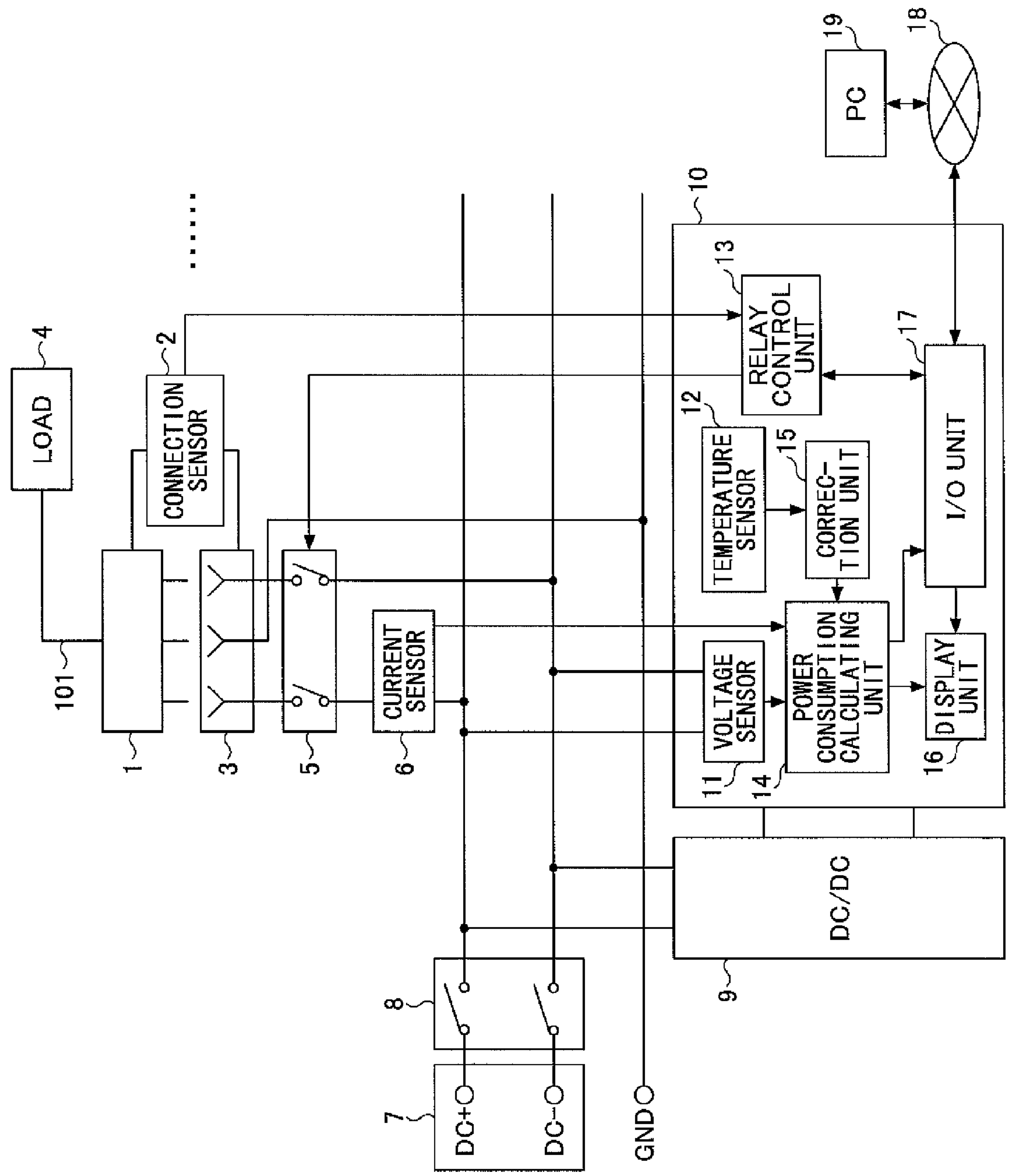
FIG. 1 is a schematic diagram illustrating an example of the configuration of a power distribution apparatus according to an embodiment.

FIG. 1 is a schematic diagram illustrating an example of the configuration of a power distribution apparatus according to an embodiment.

The power distribution apparatus according to the present embodiment includes a plug (connector) 1, a socket (connector) 3, a connection sensor 2 to detect the connected and disconnected states of the plug 1 with respect to the socket 3, a direct-current power supply 7, a breaker 8, a relay 5 to make and break a connection between the direct-current power supply 7 and the socket 3, a current sensor 6 to detect a current supplied from the direct-current power supply 7 to a load, a control board 10, and a converter 9 to convert direct-current voltage from the direct-current power supply 7 for provision to the control board 10. The direct-current power supply 7 is connected to the socket 3 via a power feeding path and the relay 5 situated in the power feeding path. The direct-current power supply 7 is connected to a load 4 upon the plug 1 being inserted into the socket 3.

<<Plug>>

Figure 2A:
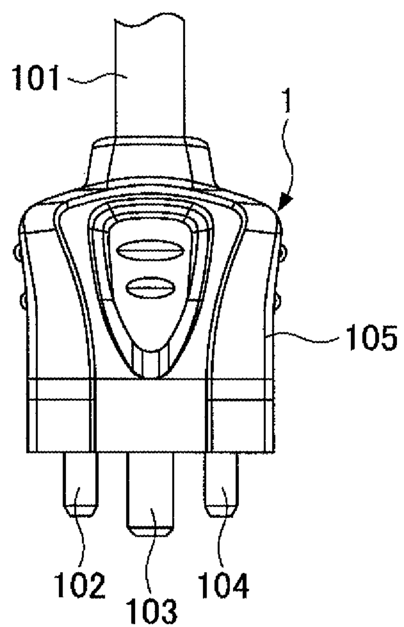
FIGS. 2A and 2B are drawings illustrating an example of the appearance of a plug.
Figure 2B:
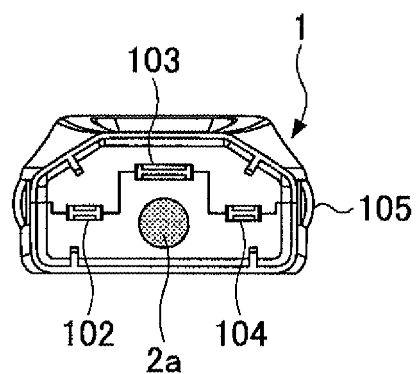

FIGS. 2A and 2B are drawings illustrating an example of the appearance of the plug 1 according to the present embodiment.

The plug 1 includes a cord 101 connected to the load 4, electrodes 102, 103, and 104, a plug cover 105, and a connection sensor 2*a*. The plug 1 supplies electric power to the load 4 upon being inserted into the socket 3.

The electrodes 102, 103, and 104 are configured to project from the end face of the plug cover 105. The electrode 102 is a positive pole, and the electrode 103 is a ground pole, with the electrode 104 being a negative pole. The electrodes 102, 103, and 104 may be made of brass or the like that offers satisfactory electrical conduction. The plug cover 105 may be made of an insulating resin or the like, and covers the point at which the electrodes 102, 103, and 104 are connected to the cord 101. The cord 101 is connected to the electrodes 102, 103, and 104 inside the plug cover 105. The cord 101 is covered with an insulating resin or the like between the plug cover 105 and the load 4. The configuration of the plug 1 is not limited to what is described above. For example, the plug 1 may be a two-pole type plug that does not have a ground pole.

<<Socket>>

Figure 3:
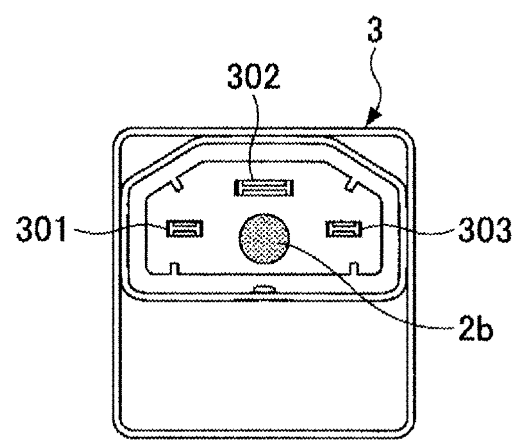
FIG. 3 is a drawing illustrating an example of the appearance of a socket.

FIG. 3 is a drawing illustrating an example of the appearance of the socket 3 according to the present embodiment.

The socket 3 includes a connection sensor 2*b* and electrode receptacles 301, 302, and 303 into which the electrodes 102, 103, and 104 of the plug 1 are inserted. The socket 3 supplies electric power to the load 4 via the plug 1 upon receiving the plug 1. The socket 3 is a one-connection-type socket to which one plug 1 is connected.

The power distribution apparatus may be configured to have one or more sockets 3. The power distribution apparatus of the present embodiment may have plural sockets 3, so that the power distribution apparatus can control power supply to a plurality of loads 4 through respective sockets 3 and plugs 1.

<<Connection Sensor>>

The plug 1 and the socket 3 of the present embodiment have the connection sensors 2*a* and 2*b*, respectively, which are arranged at such positions as to face each other when the plug 1 is inserted into the socket 3. The connection sensors 2*a* and 2*b* detect the connected and disconnected states between the plug 1 and the socket 3 to transmit a signal indicative of the detected state.

The connection sensors 2*a* and 2*b* of the present embodiment may be magnetic sensors utilizing a Hall element. The connection sensor 2*a* of the plug 1 may be magnetic material, and the connection sensor 2*b* of the socket 3 may include a Hall element. The connection sensors 2*a* and 2*b* detects a voltage change caused by a magnetic field change that occurs as the connection sensor 2*a* of the plug 1 comes close to the connection sensor 2*b* of the socket 3, thereby detecting the connected and disconnected states between the plug 1 and the socket 3.

The connection sensors 2*a* and 2*b* detect the connected state (i.e., inserted state) when the electrodes 102, 103, and 104 of the plug 1 are fully inserted into the electrode receptacles 301, 302, and 303 of the socket 3, respectively. The connection sensors 2*a* and 2*b* detect the disconnected state (i.e., unplugged state) when the electrodes 102, 103, and 104 of the plug 1 are moved in the unplugging direction to be even slightly (i.e., even partially) exposed to the outside from the socket 3. This arrangement ensures that power is supplied to the load 4 only when the plug 1 is fully inserted into the socket 3, thereby preventing arc discharge from occurring even if the plug 1 is disconnected from the socket 3 while the supply of power to the load 4 is underway.

The connection sensors 2*a* and 2*b* are not limited to magnetic sensors. The connection sensors 2*a* and 2*b* may be optical sensors, piezoelectric sensors, capacitive-type sensors, resistive-type sensors, or the like.

<<Relay>>

As illustrated in FIG. 1, the power distribution apparatus of the present embodiment includes the relay 5 that is situated in the power feeding path between the direct-current power supply 7 and the socket 3. The relay 5 opens and closes a connection of the power feeding path to supply and cut off power from the direct-current power supply 7 to the socket 3.

Figure 4A:
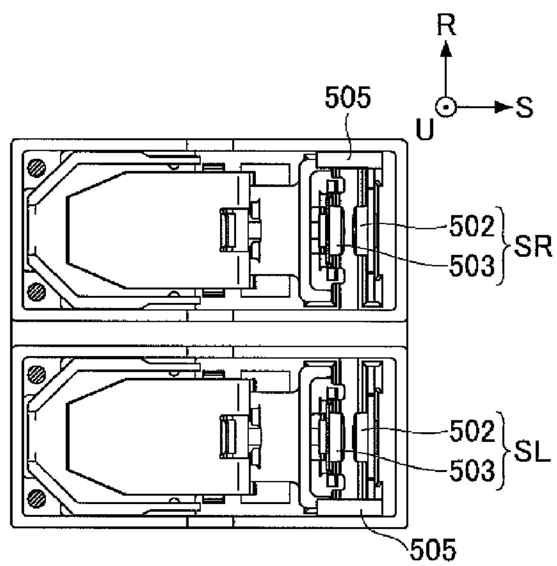
FIGS. 4A through 4C are cross-sectional views illustrating an example of the configuration of a relay.
Figure 4B:
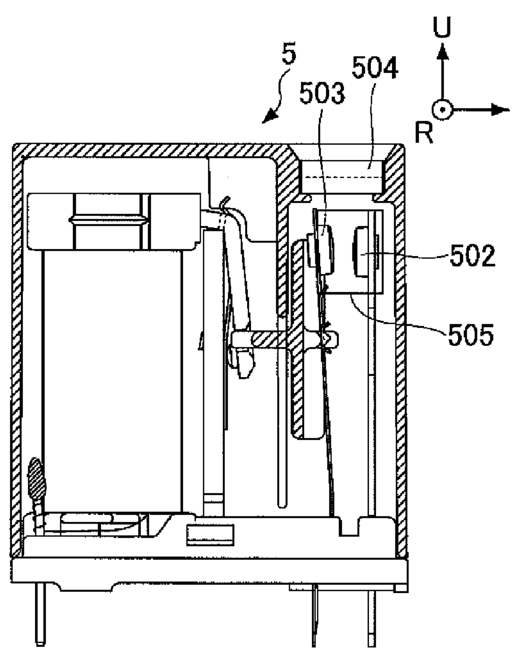
Figure 4C:
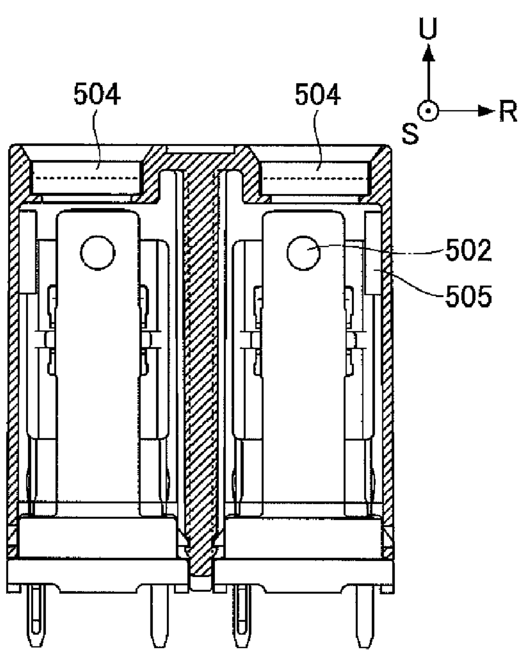

FIGS. 4A through 4C are cross-sectional views illustrating an example of the configuration of the relay 5 according to the present embodiment. A direction R indicates a direction in which contacts SL and SR forming a contact pair are arranged side by side. A direction S indicates a direction in which a movable contact 503 moves to come in contact with a fixed contact 502. A direction U indicates a direction that is perpendicular to both the direction R and the direction S.

The relay 5 of the present embodiment includes the contacts SL and SR forming a contact pair, which includes two fixed contacts 502 arranged side by side in the direction R, and which also includes two movable contacts 503 movable in the direction S and facing the respective fixed contacts 502. The relay 5 of the present embodiment further includes two permanent magnets 504, which are situated alongside the contacts SL and SR, and each of which has a polar direction facing in the direction opposite the direction U perpendicular to the direction S. The relay 5 of the present embodiment further includes two ferromagnetic bodies 505 whose plane extends in both the direction S and the polar direction of the two permanent magnets 4. When direct current is supplied to the contacts SL and SR, the direction of a force caused by the permanent magnets 504 is the same as the direction of a force caused by the ferromagnetic bodies 505. The contact SL and the contact SR are arranged side by side such that the movable directions of their movable contacts are parallel to each other.

In the relay 5, arc discharge may be generated at the gaps between the fixed contacts 502 and the movable contacts 503 as the contacts SL and SR are opened and closed. Such arc discharge serves as an electric current to generate a spiral magnetic flux around the arc, which interacts with the magnetic flux of a respective one of the permanent magnets 504 that faces in the opposite direction to the direction U. This interaction generates an electromagnetic force conforming to Fleming's left-had rule, so that the arc discharge is blown away in the opposite direction to the direction R with respect to the contact SL, and is blown away in the direction R with respect to the contact SR. Further, each of the ferromagnetic bodies 505 applies a pulling force that pulls the arc in the same direction as the direction of the electromagnetic force. Due to the combination of the electromagnetic force and the pulling force, the arc is reliably attracted to and absorbed by the corresponding one of the ferromagnetic bodies 505.

With this arrangement, arc discharge can be conveyed to the ferromagnetic bodies 505 before the arc discharge extending from one of the fixed contact 502 and the movable contact 503 reaches the other. It follows that the electric and thermal energy of the arc is absorbed and removed by the ferromagnetic body 505.

The relay 5 is not limited to the configuration illustrated in FIGS. 4A through 4C. A relay having a general configuration may be used as long as the contacts can be opened and closed in the power feeding path between the direct-current power supply 7 and the socket 3.

<<Current Sensor>>

The current sensor 6 is of a Hall-element type that detects current supplied from the direct-current power supply 7 to the load 4. The current sensor 6 may include an iron core ring having a gap and a Hall element. A magnetic flux generated by electric current to be detected is converged by the iron core, and the converged magnetic flux is converted by the Hall element into a voltage signal, which is used to detect the value of the electric current. Alternatively, the current sensor 6 may be a MR-type sensor using a magnetoresistance element, a sensor utilizing a shunt resistance, or the like.

<<Control Board>>

The control board 10 has circuitry implemented thereon for achieving the functions of a voltage sensor 11, a temperature sensor 12, a relay control unit 13, a power consumption calculating unit 14, a correction unit 15, a display unit 16, and an I/O unit 17. The voltage sensor 11 serves to detect the voltage of the direct-current power supply 7, and the temperature sensor 12 serves to detect the ambient temperature of the power distribution apparatus.

The voltage sensor 11 has the function to detect the voltage of the direct-current power supply 7, and the temperature sensor 12 has the function to detect the ambient temperature of the power distribution apparatus.

The power consumption calculating unit 14 multiplies the current detected by the current sensor 6 with the voltage detected by the voltage sensor 11 to calculate an electric power consumed by the load 4. The current sensor 6 of the present embodiment may have the detected temperature that changes in response to ambient temperature due to the temperature dependency of the Hail element. In consideration of this, the correction unit 15 corrects the current detected by the current sensor based on the ambient temperature of the power distribution apparatus detected by the temperature sensor 12. Based on the corrected current, the power consumption calculating unit 14 calculates the consumed electric power. The display unit 16 displays the consumed electric current calculated by the power consumption calculating unit 14, the power feeding status with respect to the load 4, and so on.

The relay control unit 13 controls the open and closed states of the relay 5. The relay control unit 13 closes the contacts of the relay 5 to supply electric power to the load 4 via the plug 1 and the socket 3. The relay control unit 13 opens the contacts of the relay 5 to cut off electric power to the load 4.

The I/O unit 17 is an input and output circuit to communicate with peripheral devices such as a PC 19, which has a communication function and is connected via a network 18 such as a LAN (Local Area Network) or WAN (Wide Area Network), which is implemented by use of wired and/or wireless data transmission lines. The I/O unit 17 serves as a receiver to receive signals indicating the supplying and cutting off of power to the load 4 and also as a transmitter to transmit control signals to the relay control unit 13 to control the relay 5. Further, the I/O unit 17 transmits information about the connected and disconnected states between the plug 1 and the socket 3 as detected by the connection sensor 2, information about the power feeding states with respect to the load 4 as controlled by the relay control unit 13, information about the amount of electric power consumption as calculated by the power consumption calculating unit 14, etc., to the PC 19 that is connected via the network 18.

In order to use the power distribution apparatus of the present embodiment for supplying power to the load 4, the PC 19 at a location remote from the power distribution apparatus is utilized to check the connected and disconnected states between the plug 1 and the socket 3 as well as the power feeding state with respect to the load 4 and to transmit a signal indicating whether to supply or cut off power to the load 4. In response to the signal from the PC 19 received by the I/O unit 17, the relay control unit 13 opens or closes the relay 5.

In so doing, even upon receiving a signal from the PC 19 requesting the supply of power, the relay control unit 13 opens the contacts of the relay 5 to cut off power supply from the direct-current power supply 7 as long as the connection sensor 2 detects the disconnected state between the plug 1 and the socket 3. Only after the connection sensor 2 detects the connected state between the plug 1 and the socket 3, the relay control unit 13 closes the contacts of the relay 5 to supply power to the load 4 upon receiving the signal at the I/O unit 17 that requests to supply power to the load 4. If the connection sensor 2 detects the disconnected state between the plug 1 and the socket 3 while power supply to the load 4 is underway, the relay control unit 13 opens the contacts of the relay 5 to cut off power supply to the load 4.

<Summary>

As described above, the power distribution apparatus of the present embodiment uses the relay control unit 13 to control the open and closed states of the relay 5 in response to the connected and disconnected states between the plug 1 and the socket 3 as well as a signal requesting the supply and cutoff of power to the load 4, thereby reliably preventing arc discharge from occurring between the plug 1 and the socket 3 and also allowing power supply to the load 4 to be remotely controlled.

Further, the provision of the permanent magnet and ferromagnetic body in the vicinity of the fixed contact and the movable contact ensures that arc discharge generated at the time of opening and closing the contacts of the relay is removed even though the direct-current power supply 7 is used as a power supply. Accordingly, a highly safe, durable power distribution apparatus can be provided, making it possible to control power supply to the load 4 in a reliable manner over a long time period.

Moreover, the amount of power consumption by the load 4 may be checked before making a decision as to whether to cut off power supply to the load 4. This arrangement makes it possible to achieve energy conservation and efficient system utilization.

Although the present invention has been described heretofore by referring to one or more embodiments, the present invention is not limited to such embodiments. Various variations and modifications may be made without departing from the scope of the present invention.

The present application is based on Japanese priority application No. 2011-285156 filed on Dec. 27, 2011, with the Japanese Patent Office, the entire contents of which are hereby incorporated by reference.

What is claimed is:

1. A power distribution apparatus for connection with a remote controller via a network and for supplying power from a direct-current power supply to a load via a first connector and a second connector, comprising:

- a sensor unit configured to detect connected and disconnected states between the first connector and the second connector;
- a switch unit configured to make and break a connection between the first connector and the direct-current power supply;
- a receiver unit configured to receive, from the remote controller via the network, a signal indicating whether to supply or cut off power to the load;
- a transmitter unit configured to transmit, to the remote controller via the network, information about the connected and disconnected states detected by the sensor unit between the first connector and the second connector; and
- a control unit configured to control the switch unit to make or break the connection in response to both the signal received by the receiver unit and the connected and disconnected states between the first connector and the second connector detected by the sensor unit.

2. The power distribution apparatus as claimed in claim 1, further comprising:

- a current detecting unit configured to detect electric current supplied from the direct-current power supply to the load;
- a voltage detecting unit configured to detect voltage of the direct-current power supply; and
- a power consumption calculating unit configured to calculate a consumed electric power from the electric current detected by the current detecting unit and the voltage detected by the voltage detecting unit.

3. The power distribution apparatus as claimed in claim 2, further comprising:

a temperature detecting unit configured to detect ambient temperature of the power distribution apparatus; and a correction unit configured to correct the electric current detected by the current detecting unit in response to the ambient temperature detected by the temperature detecting unit.

4. The power distribution apparatus as claimed in claim 1, wherein the switch unit makes the connection upon a simultaneous occurrence of both the signal indicative of supply of the power to the load and the connected state indicative of presence of a connection between the first connector and the second connector.

5. The power distribution apparatus as claimed in claim 1, wherein the switch unit breaks the connection between the first connector and the direct-current power supply as long as the sensor unit detects the disconnected state indicative of absence of a connection between the first connector and the second connector.

* * * * *